(12) United States Patent
Zimniewicz et al.

(10) Patent No.: US 6,618,857 B1
(45) Date of Patent: *Sep. 9, 2003

(54) METHOD AND SYSTEM FOR INSTALLING SOFTWARE ON A COMPUTER SYSTEM

(75) Inventors: Jeff A. Zimniewicz, Bellevue, WA (US); Crista Johnson, Seattle, WA (US); Phillip J. Marino, Dublin, OH (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,582

(22) Filed: Mar. 27, 2000

(51) Int. Cl.[7] ............................................... G06F 9/445
(52) U.S. Cl. ....................................... 717/175; 707/203
(58) Field of Search .......................... 717/11, 168–178; 707/203

(56) References Cited

U.S. PATENT DOCUMENTS

| | | | |
|---|---|---|---|
| 5,950,010 A | * | 9/1999 | Hesse et al. .................. 717/11 |
| 5,960,204 A | | 9/1999 | Yinger et al. |
| 5,966,540 A | * | 10/1999 | Lister et al. .................. 717/11 |
| 6,134,593 A | | 10/2000 | Alexander et al. |
| 6,279,154 B1 | * | 8/2001 | Davis .......................... 717/11 |
| 6,282,711 B1 | * | 8/2001 | Halpern et al. ............. 717/176 |
| 6,301,708 B1 | * | 10/2001 | Gazdik et al. .............. 717/175 |
| 6,327,705 B1 | | 12/2001 | Larsson et al. |
| 6,418,554 B1 | * | 7/2002 | Delo et al. .................. 717/178 |

OTHER PUBLICATIONS

Plumley, "Documented Backoffice", John Wiley & Sons, Inc. 1998.
*Smart Update Developer's Guide*, "Chapter 4 Writing an Installation Script", available at http://developer.netscape.com/docs/manuals/communicator/jarman/install.html, accessed Jan. 15, 2001.

* cited by examiner

*Primary Examiner*—Gregory Morse
*Assistant Examiner*—Chuck Kendall
(74) *Attorney, Agent, or Firm*—Leydig Voit & Mayer, Ltd.

(57) ABSTRACT

A method and system for installing software on a computer prepares a computer system for the installation of a suite having a plurality of components. A setup program queries each component to determine which of the components is a prerequisite to the installation of the suite and which is a prerequisite for installation in a particular scenario. The setup program installs those components that are determined to be suite or scenario prerequisites on the computer system. The setup program creates a baseline installation image containing the installed components as well as the data elements required to complete the installation of the suite.

45 Claims, 6 Drawing Sheets

METHOD AND SYSTEM FOR INSTALLING SOFTWARE ON A COMPUTER SYSTEM

TECHNICAL FIELD

This invention relates generally to the installation of software on computer systems and more particularly to the installation of a group of related programs, such as those in a software suite.

BACKGROUND

A typical software product, such as a database, word processor, or spreadsheet may be organized into a group or "suite" of individual component programs, or "components." For example, STRUCTURED QUERY LANGUAGE (SQL) SERVER is a software product developed by the MICROSOFT corporation that includes several components, such as the core SQL binaries (including the SQL dynamically linked library (DLL)), the INTERNET EXPLORER program and the MICROSOFT DATA ACCESS COMPONENTS (MDAC) program. The SQL SERVER software product may therefore be considered a suite. More typically, a suite includes several distinct software products, each having its own components and possibly sharing one or more components with other products in the suite. An example of such a suite is BACKOFFICE SERVER by MICROSOFT, which groups several MICROSOFT products, including SQL SERVER, EXCHANGE SERVER, HOST INTEGRATION SERVER (HIS), PROXY SERVER, FAX SERVER, SYSTEMS MANAGEMENT SERVER (SMS), MS SEARCH, MDAC, and INTERNET EXPLORER into a single software suite. A partial list of the components in the BACKOFFICE suite includes SQL SERVER, EXCHANGE SERVER, INTERNET EXPLORER, MS SEARCH, and MDAC. The INTERNET EXPLORER component is used in the SQL SERVER product, while the MS SEARCH component is used by both the SQL and EXCHANGE SERVER products.

Many of the components of a software suite may not be required for installation of the suite as a whole, but may, instead, be included as enhancements or options. The developer of the suite, however, may wish to require that some of the components be installed when the software suite is being used for certain scenarios. For example, if the software suite is installed on a computer system that is a part of a multi-location network, the suite developer may wish to require that more networking components be installed than in a stand-alone scenario. Some components may be required regardless of the scenario in which the suite is being used. For example, the suite developer may periodically introduce updates and patches to various components in the form of so-called "service packs" and "hot fixes." It may be desirable to make service packs and hot fixes mandatory components that get installed as a prerequisite to installation of an entire software suite, regardless of the scenario for which the suite is being used.

A developer of a software suite may also wish to insure that when a user installs a software suite on a computer system, the system is first brought to a predetermined state in terms of which programs are initially installed. This simplifies the suite installation process by eliminating the need to account for all of the different versions of components that may already be installed on the system. For example, the suite developer may wish to require that every computer system on which the suite will be used is running the latest version of a particular operating system before allowing the full suite to be installed. This saves the developer the trouble of having to write a different setup procedure for each version of the operating system.

SUMMARY OF THE INVENTION

In accordance with the foregoing, the invention provides a method and system for installing a software suite with multiple components on a computer system, in which one or more of the components has an interface that allows a setup program to query the component to determine whether the component is required as a prerequisite to installation of the suite. Through the interface, a component responds to the query by indicating whether it is a prerequisite for the suite. The setup program installs those components that are determined to be suite prerequisites on the computer system, thereby creating a baseline installation image containing the installed components.

The setup program may also prompt a user to choose a scenario for which the suite is being used, and in response to the user's input, query each component to determine which of the components is a prerequisite to operation of the suite for the chosen scenario. The setup program may then modify the baseline installation image by installing those components that are determined to be required for the scenario. The setup program may further modify the baseline installation image to include additional data elements required for operation of the suite.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
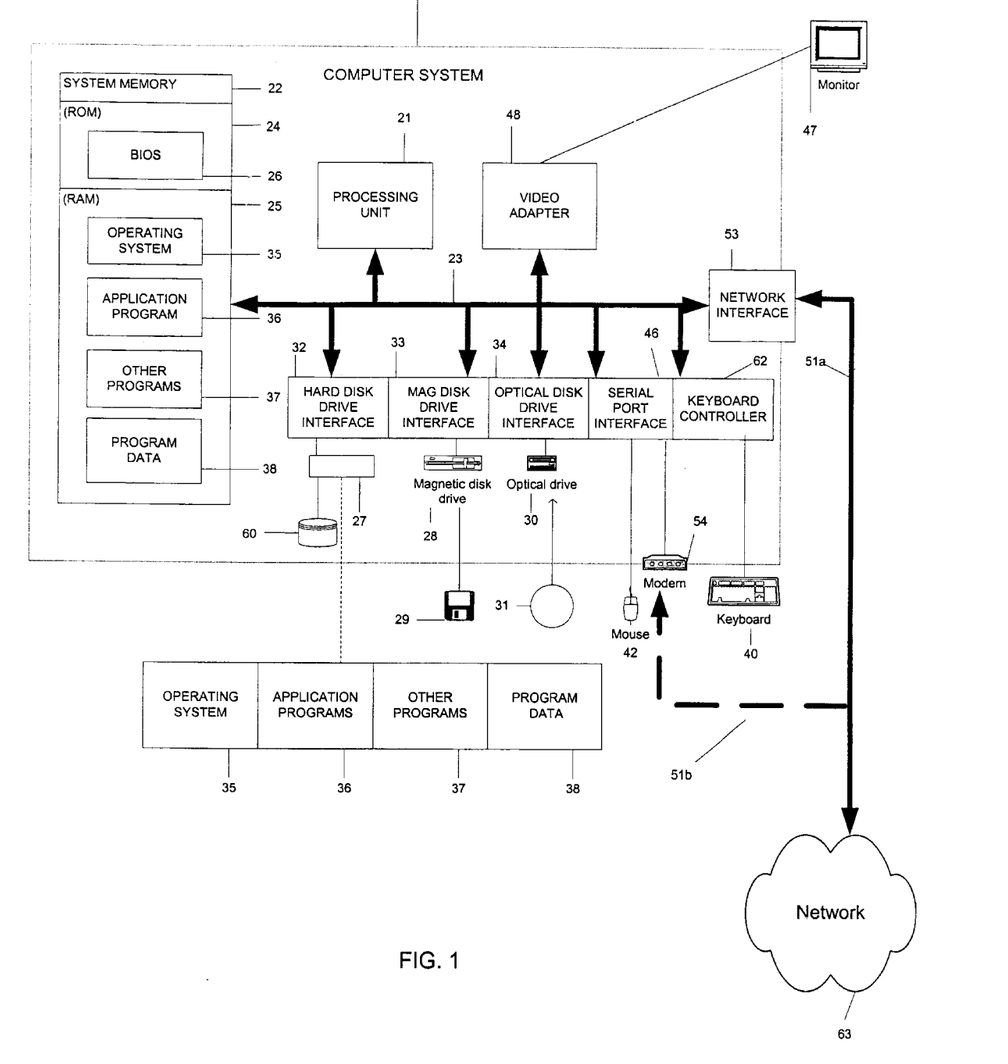
FIG. 1 is a block diagram generally illustrating an exemplary computer system on which the present invention may be used.

Turning to the drawings, wherein like reference numerals refer to like elements, an exemplary environment for implementing the invention is shown in FIG. 1. The environment includes a general purpose-computer system 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer system 20, such as during start-up, is stored in the ROM 24. The computer system 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

If including in the computer system 20, the hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer system 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks. Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more application programs 36, other programs 37, and program data 38. A user may enter commands and information into the computer system 20 through input devices such as a keyboard 40, which is typically connected to the computer system 20 via a keyboard controller 62, and a pointing device, such as a mouse 42. Other input devices (not shown) may include a microphone, joystick, game pat, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computer systems typically include other peripheral output devices, not shown, such as speakers and printers.

The computer system 20 may operate in a networked environment using logical connections to one or more devices within a network 63, including another computer system, a server, a network PC, a peer device or other network node. These devices typically include many or all of the elements described above relative to the computer system 20. The logical connections depicted in FIG. 1 include a land-based network link, for which there are many possible implementations, including a local area network (LAN) link 51a and a wide area network (WAN) link 51b. Land-based network links are commonplace in offices, enterprises-wide computer networks, intranets and the Internet and include such physical implementations as coaxial cable, twisted copper pairs, fiber optics, and the like. Data may transmitted over the network links 51 according to a variety of well-known transport standards, including Ethernet, SONET, DSL, T-1, and the like. When used in a LAN, the computer system 20 is connected to the network 63 through a network interface card or adapter 53. When used in a WAN, the computer system 20 typically includes a modem 54 or other means for establishing communications over the network link 51, as shown by the dashed line. The modem 54, which may be internal or external, is connected to the system bus 23 via the serial port interface 46. In a networked environment, programs depicted relative to the computer system 20, or portions thereof, may be stored on other devices within the network 63.

Those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will be made to one or more programs or components executing on a computer system or being executed by parts of a CPU. A "program," "component program," or "component" is any instruction or set of instructions that can execute on a computer, including a process, procedure, function, executable code, dynamic-linked library (DLL), applet, native instruction, module, thread, or the like. However, while the invention is being described in the context of software, it is not meant to be limiting as those of skill in the art will appreciate that various of the acts and operation described hereinafter may also be implemented in hardware.

Figure 2:
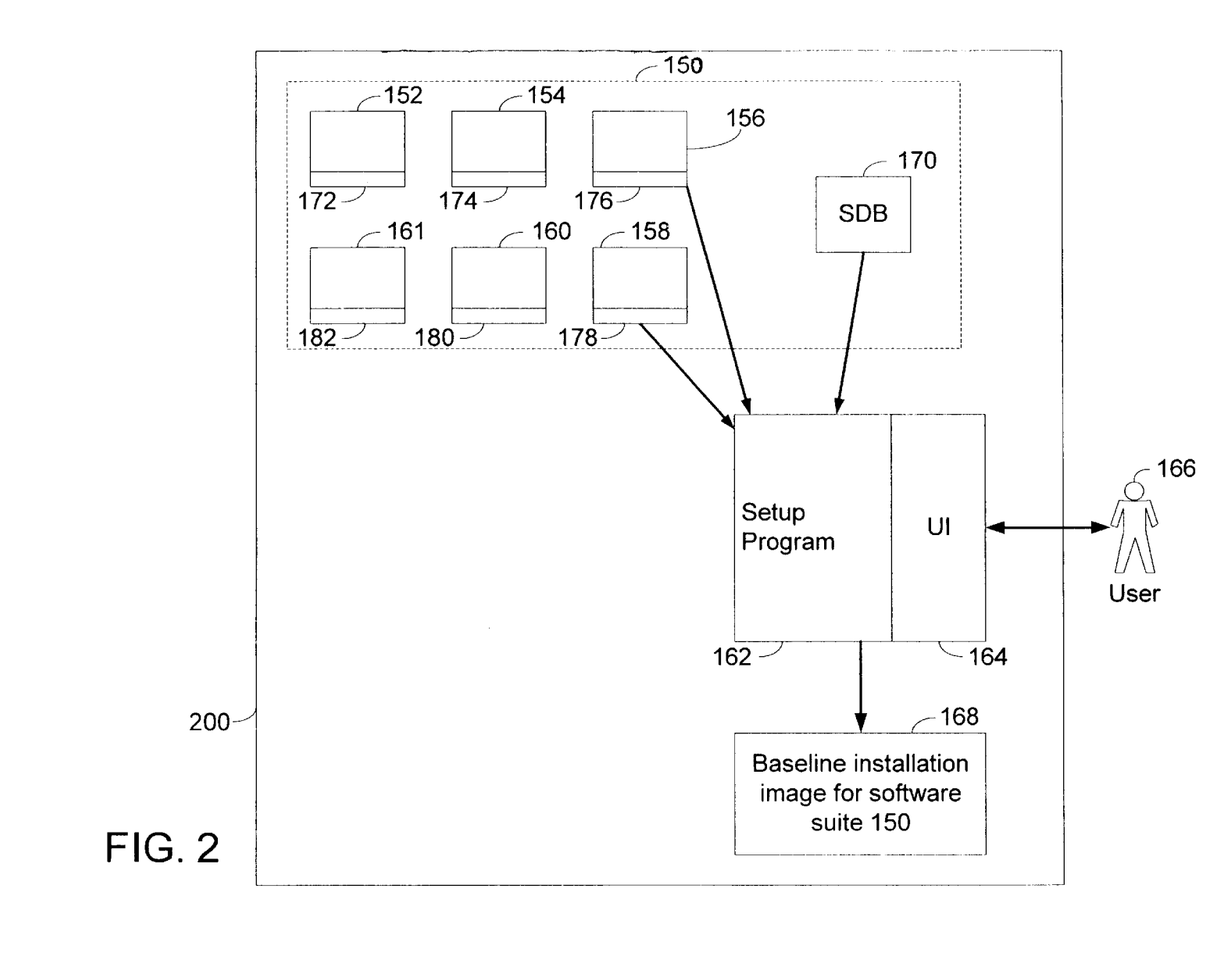
FIG. 2 is a block diagram generally illustrating how a preferred embodiment of the invention interacts with components of a software suite to prepare a computer system for installation of the suite.

Referring to FIG. 2, the present invention is directed to a method and system for installing software on a computer system, such as the computer system 200. In accordance with an embodiment of the invention, components 152, 154, 156, 158, 160 and 161 of an exemplary software suite 150 each have a programming interface labeled 172, 174, 176, 178,180 and 182 respectively. The programming interfaces 172–182 allow the components to provide information as to their properties through their respective interfaces to a calling program. When a calling program queries a component via its programming interface, the component executes a function that returns a response to the calling program. The response contains, for example, a pointer to an alphanumeric expression that describes the property that was the subject of the query. The programming interfaces 172–80 may be implemented in a variety of ways, but component object model (COM) interfaces are known to be suitable.

In accordance with the invention, a setup program 162 interacts with a user 166 through a user interface (UI) 164 to install one or more of the components 152–161 of the suite 150 and thereby create a baseline installation image 168 for the suite 150 on the computer system 200. The baseline installation image 168 contains the installed image of one or more of the components 152–161 that are required to be on the computer system 200 as a prerequisite to full installation of the suite 150. The baseline installation image 168 may be modified to include those components that are a prerequisite to using the suite 150 in a particular scenario. It may also be further modified to include files, directories, settings and other data elements that are required as a prerequisite. In FIG. 2, for example, the baseline installation image 168 is illustrated as including the components 156 and 158. The image 168 may be distributed among various memory types on the computer system 200, such as RAM and disk memory. It may also include settings in an operating system registry, such as the SYSTEM REGISTRY of the MICROSOFT WINDOWS family of operating systems.

A setup database (SDB) 170 may also be included as part of the suite 150. The setup program 162 interacts with the SDB 170 to create the baseline installation image 168. The SDB 170 is a data structure that stores installation information for the suite 150, including the identification of which component(s) of the suite 150 are required to be installed as part of the baseline installation image 168. The SDB 170 is preferably implemented as a text file, such as a MICROSOFT INI file, to allow the suite developer to easily specify which of the components are required for the baseline installation image 168 by, for example, editing the SDB 170 with a text editor.

Additionally, the components 152–161 themselves may inform the setup program 162 whether they are required to be installed as part of the baseline installation image 168 through their respective programming interfaces 172–180. Specifically, the setup program queries one or more of the programming interfaces 172–180 to determine which of the components 152–161 are required to be installed as part of the baseline installation image 208. In a preferred embodiment, however, the setup program 162 uses the programming interfaces 172–180 in conjunction with the SDB 170 to determine which of the components 152–161 belong in the baseline image 208. Where the SDB 170 and the responses from the programming interfaces 172–180 conflict, the entries in the SDB 170 take precedence. Thus, the SDB 170 may be used to override the responses of the programming interfaces 172–180. This gives the suite author the flexibility to make last minutes changes to the to the "list" of suite and scenario baseline components by simply editing the SDB 170. Of course, the SDB 170 or the programming interfaces may also provide the suite and scenario baseline information without the assistance of one another.

Figure 3:
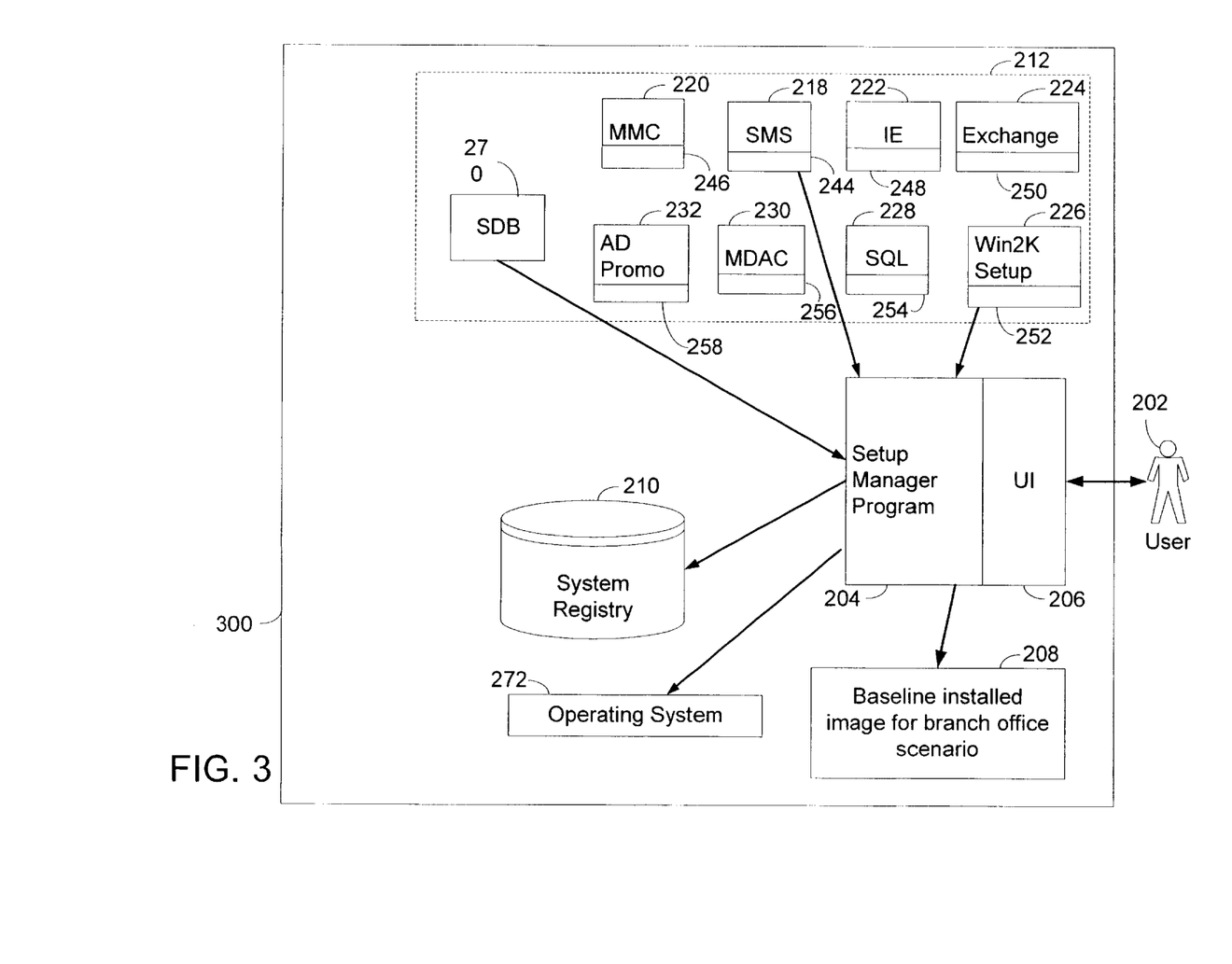
FIG. 3 is a block diagram generally illustrating how a preferred embodiment of the invention prepares a computer system for the installation of a MICROSOFT BACKOFFICE SERVER suite.
Figure 4:
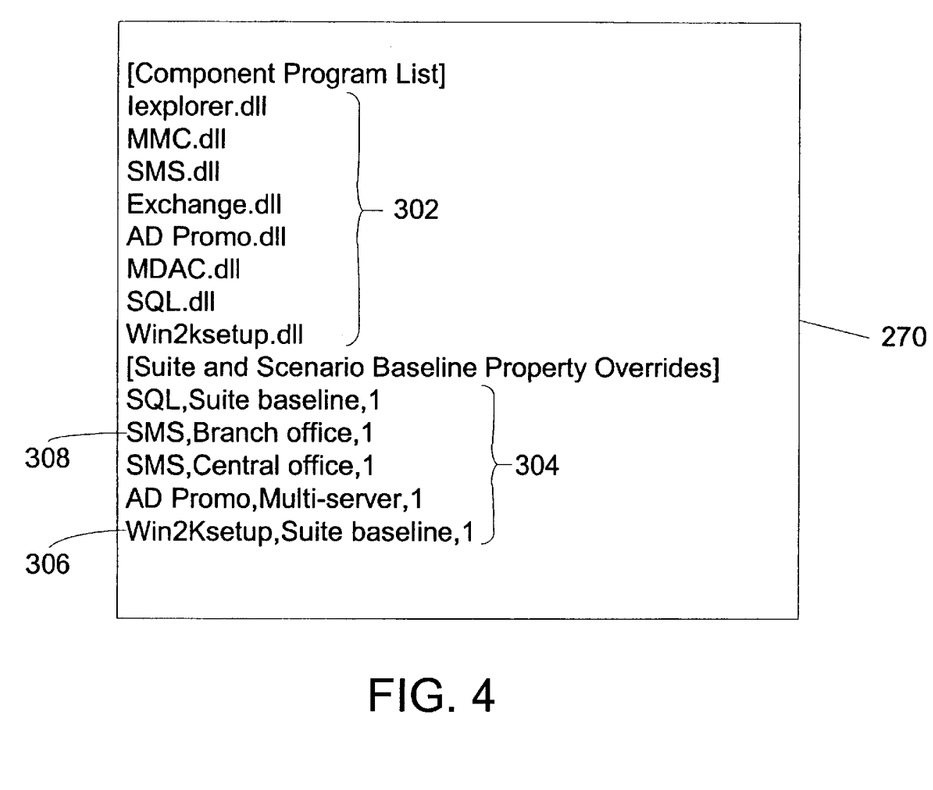
FIG. 4 illustrates a setup database in accordance with a preferred embodiment of the invention.
Figure 5:
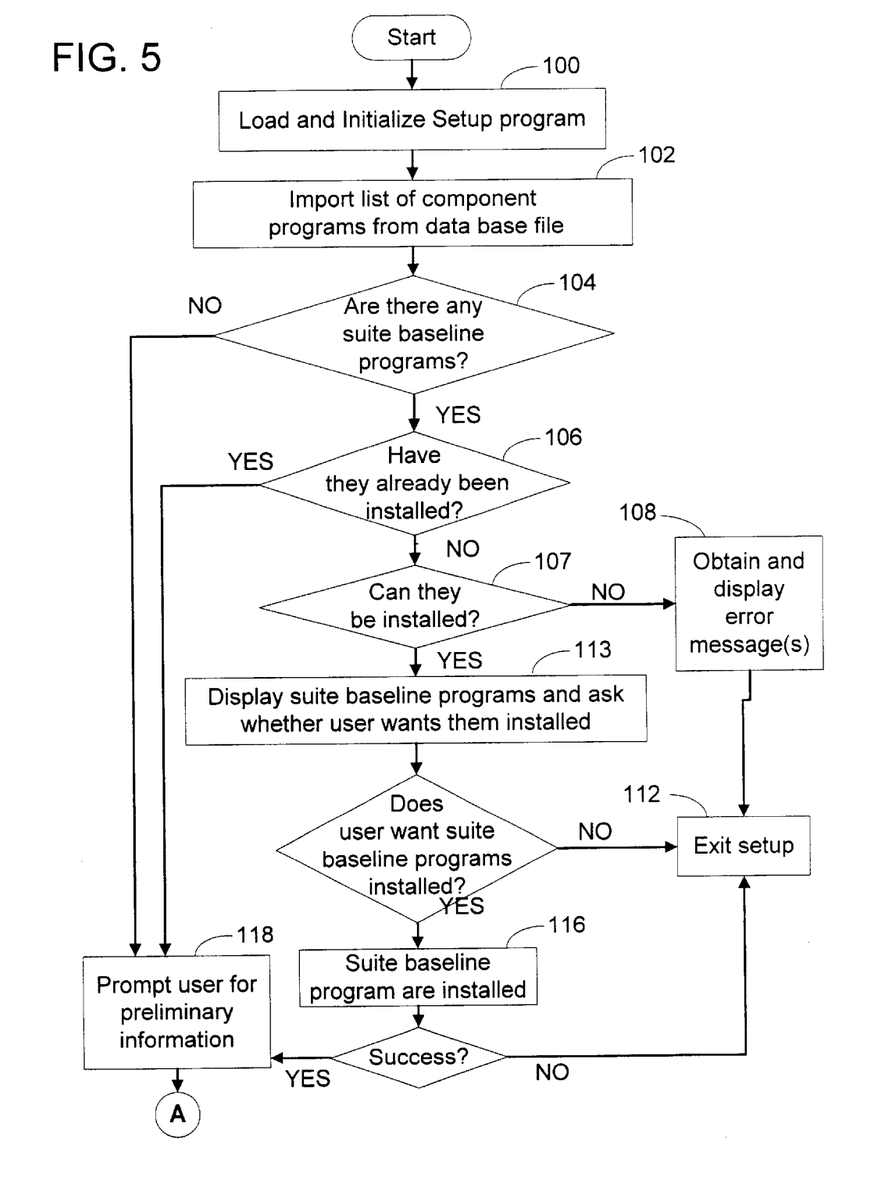
FIGS. 5 and 6 are a flowchart generally a procedure that may be followed when preparing a computer system for the installation of a software suite in accordance with a preferred embodiment of the invention.
Figure 6:
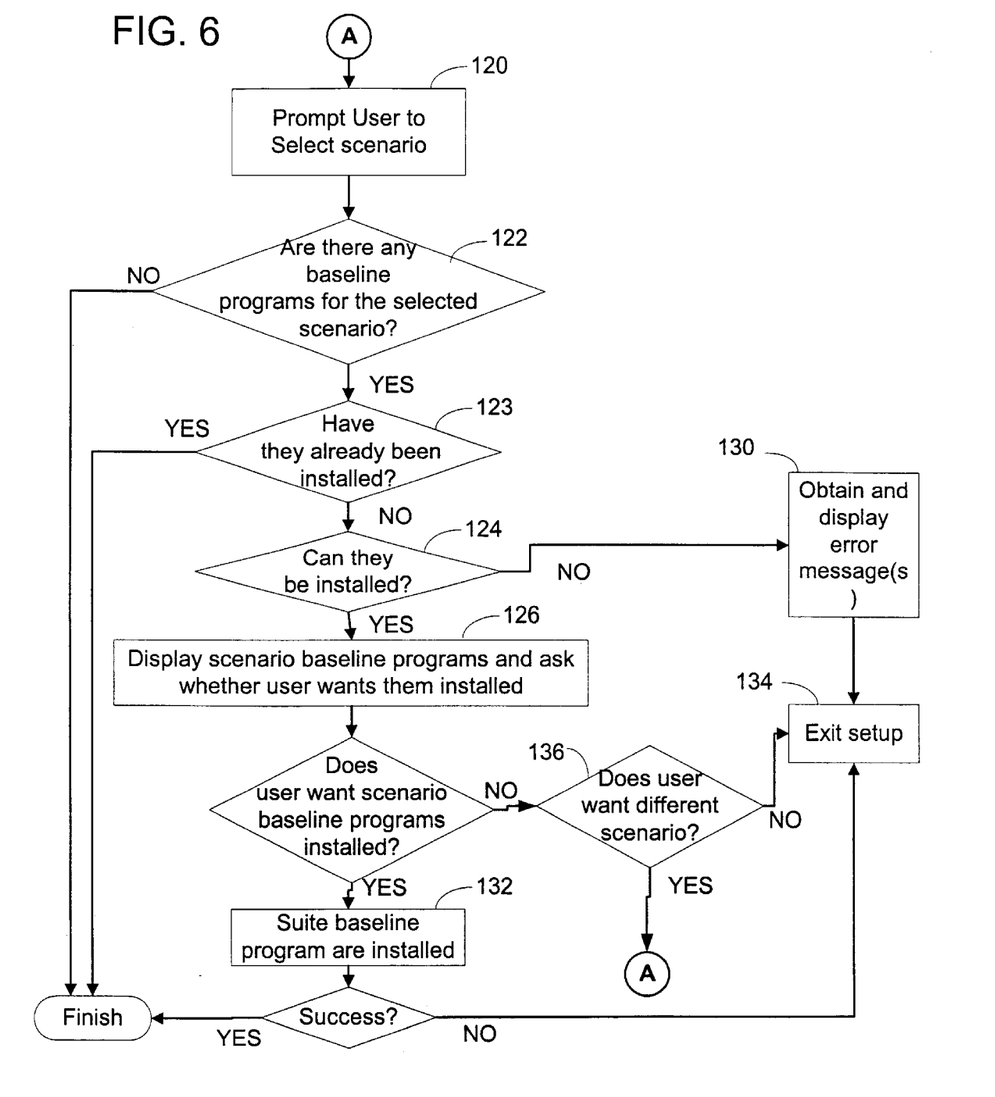

Referring to FIGS. 3–6, a preferred embodiment of the invention is illustrated by describing an example of a creation of a baseline installation image 208 (FIG. 3) for a MICROSOFT BACKOFFICE software suite 212 in a work group scenario on a computer system 300. A "work group" scenario refers to a situation in which a server is not connected to other servers, but operates within its own stand-alone network. The steps performed by a setup program 204 in this example are shown in FIGS. 5 and 6. For the purpose of this example, it will be assumed that a setup database (SDB) 270 is included with the suite 212 and contains the lines of text shown in FIG. 4, including a list 302 of the components 218–232, and a set 304 of override parameters for use in overriding the one or more responses received from the programming interfaces 244–258. The override parameters are formatted as follows: <component>, <property>, <value>. The <component> field contains the name of the component. The <property> field describes the property to which the override parameter refers e.g. "suite baseline." The <value> field contains the value for the property. In this example, a '1' indicates that the property is turned and a '0' indicates that property is not turned on. For example, the parameter 306 indicates that the "suite baseline" property of the WIN2KSETUP component is turned on, and therefore that the WIN2KSETUP program is required to be installed as part of the baseline installation 208 for the suite 212.

The BACKOFFICE suite 212 also includes the MICROSOFT components SYSTEMS MANAGEMENT SERVER (SMS) 218, MICROSOFT MANAGEMENT CONSOLE (MMC) 220, INTERNET EXPLORER (IE) 222, EXCHANGE SERVER 224, WINDOWS 2000 (WIN2K) SETUP 226, STRUCTURED QUERY LANGUAGE (SQL) 228, MICROSOFT DATA ACCESS COMPONENTS (MDAC) 230 and the ACTIVE DIRECTORY INSTALLATION WIZARD (AD WIZARD) program 232. Other components may be included as well, and the components 218–226 are only meant to be exemplary. The components 218–226 have respective programming interfaces 244–258. A system registry 210 maintains information as to the current configuration of the computer system 300 for the operating system 272 of the computer system 300. In this example, it is assumed that the operating system of the computer system 300 is the MICROSOFT WINDOWS NT 4.0 operating system.

Referring to FIG. 5, the setup program 204 loads and initializes at step 100. At step 102 the setup program 204 imports a list 302 (FIG. 4) of the components 218–232 from the setup database 270. At step 104, the setup program 204 references the set 304 of override parameters of the SDB 270 and queries the components 218–232 via their programming interfaces 244–258 to determine whether any of them are required to create the baseline installed image 208 (FIG. 4). If no components are required, then the flow continues at step 118.

In this example, it is assumed that each of the programming interfaces 244–258 responds to the query by indicating that it is not required to create a baseline installation image for the suite 212. By referencing the set 304 of override parameters (FIG. 4), the setup program 204 ,determines that, based on lines 306 and 308, the SQL component 228 and the WIN2KSETUP component 226 are baseline components for the suite 212 and therefore need to be installed on the computer system 300 as part of the baseline installation image 208. At step 106 the setup program 204 uses conventional detection technology to detect whether the components SQL SERVER 228 and WIN2KSETUP 226 have already been installed on the computer system 300. If so, then the flow continues at step 118. If not, then at step 107 the setup program 204 determines whether the missing components may be installed. For example, the setup program 204 may examine the appropriate entry in the system registry 210 to determine the availability of adequate resources, such as RAM, disk space and a WINDOWS NT file system (NTFS) drive. If the setup program 204 determines that any of the suite baseline components (in this case, SQL SERVER and WIN2KSETUP) cannot be installed, then the flow proceeds to step 108. At step 108 the setup program 204 communicates with the SQL SERVER or WINK2SETUP components 228 or 226 via their programming interfaces 254 and 252 to obtain the appropriate error message(s) of the component(s) that explain why the program(s) cannot be installed and displays the error message(s) to a user 202 via a user interface (UI) 206. The flow then proceeds to step 112 at which the setup program 204 is terminated.

If the missing component(s) can be installed, then the setup program 204 displays a list of the component(s) that need to be installed to the user 202 via the UI 206 at step 113 and prompts the user 202 to indicate whether he wants the program(s) installed. If the user 202 indicates that he does not want to install one or more of the listed component(s), a message is displayed via the UI 206 indicating that the setup cannot continue unless the listed component(s) are installed. The flow then proceeds to step 112 at which the setup program 204 terminates.

If the user 202 indicates that he does want to install the listed component(s), then the flow proceeds to step 116 at which the component(s) are installed. In this case, it is assumed that the setup program 204 has detected the presence of the correct version of SQL SERVER, but has also detected that the operating system 272 is the WINDOWS NT 4.0 operating system and not the WINDOWS 2000 operating system. Thus, the WIN2KSETUP component 226 will be installed during this step. Such installation may include placing a run-once entry into the system registry 210 instructing the operating system 272 to re-boot so that the WIN2KSETUP program is executed. During the installation procedure the setup program 204 may display a progress bar to the user via the UI 206. Once the WINDOWS 2000 operating system has been installed, the execution of the setup program 204 is resumed at step 116. At this point in the example, the baseline installation image 208 is now in existence, and comprises the installed image of the WINDOWS 2000 operating system. If the installation of the required components in this case WIN2KSETUP is unsuccessful for any reason, the setup program 204 displays an error message to the user and the setup program 204 terminates at step 112.

If the installation of the required components was successful then the flow moves to step 118 at which the setup program 204 prompts the user 202 for preliminary information (e.g., in which directory the suite should be installed). Once the user has responded with input, the setup program 204 prompts the user to select a scenario at step 120. In this example, it is assumed that there are four available scenarios: branch office—in which the computer system is located in a branch office networked with a central office; central office—in which the computer system is located at a central office networked with one or more branch offices; multi-server—in which each product of the suite runs on a separate server; and work-group—in which the server will not need to be networked with other servers. It is also assumed that the user 202 has selected the branch office scenario.

At step 122 the setup program 204 determines whether any of the components 218–232 are required for the selected scenario, which, in this example, is the branch office scenario. This may be accomplished by referencing the set 304 of override parameters of the SDB 270 and querying the components 218–232 via their programming interfaces 244–258 (FIG. 4). In this case, it is assumed that all of the components 218–232 have indicated in response to the query that they are not required for the branch office scenario. As can be seen in FIG. 4, however, there is a required component for the branch office scenario—the SMS component 218—listed in the SDB 270. The parameter 308 (FIG. 4) is therefore used to override the response of the programming interface 244. If there are any components required for the selected scenario, then at step 123 the setup program 204 uses conventional detection technology to determine whether they are already installed. In this case, the setup program 204 detects whether the SMS component is installed. If they are not already installed then the flow proceeds to step 124 in which the setup program 204 determines whether the required components (in this case SMS) can be installed, such as by performing the actions described above in step 107. If the required components cannot be installed, then at step 130 the setup program retrieves the appropriate error message(s) from the component(s) that cannot be installed and displays the message(s) to the user as described above in step 108.

If the required component(s) can be installed, then the setup program 204 displays a list of the components required for the scenario at step 126 and asks the user whether he wants them installed. If the user does not want one or more of the components required for this scenario installed then the user is given the option to select a different scenario at step 136.

If the user wishes to select a different scenario, then the flow returns to step 120. If not, then an error message is displayed to the user via UI 206 indicating that the setup can't continue for the selected scenario without the listed program(s) being installed. The setup program 204 then exits at step 134. If the user does wish to install the component required for that scenario, then the flow proceeds to step 132 at which the components required for the selected scenario are installed. In this example, it is assumed that the SMS component 218 was not detected on the computer system 300, that there were sufficient resources for it to be installed, and that the user 202 chose to have it installed. The setup program would thus install the SMS component 218 at step 132 and thereby modify the baseline installation image 208. If the installation of any of the required components fails then an error message is displayed to the user 202 via the UI 206 indicating why the failure occurred and then the setup program terminates step 134.

If the installation of the scenario baseline components is successful, then the process of incorporating the prerequisite components into the baseline installation image 208 will be complete. In this example, the baseline installation image now comprises the WINDOWS 2000 operating system and the SMS component. The setup program 204 or other program may then continue preparing the computer system 300 for the installation of the suite 212 by installing other data elements to further modify the baseline installation image 208. This may include, for example, changing settings in the system registry 210, creating the appropriate directories for the full installation of the suite 212 or installing one or more additional files. The setup program 204 or other program may then install the rest of the programs that come with suite 212 as part of the chosen scenario.

In view of the many possible embodiments to which the principals of this invention may be applied, it should be recognized that the embodiment described herein with respect to the drawing figures is meant to be illustrative only and should not be taken as limiting the scope of the invention. It should also be recognized that the ordering and the specific implementation of the steps described above and depicted in the flowchart of FIGS. 5 and 6 may be altered in obvious ways.

Finally, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of installing a software suite on a computer system, the suite having a plurality of component programs, the method comprising: querying each of the component programs of the plurality of component programs to determine which of the component programs is a prerequisite to the installation of the suite; and installing on the computer system each component program of the plurality of component programs that, as a result of the querying step, responds with an indication that it is a prerequisite.

2. The method of claim 1, wherein the installing step further comprises creating a baseline installation image comprising those component programs that are installed in the installing step.

3. The method of claim 2, further comprising installing at least one data element to modify the baseline installation image.

4. The method of claim 3, wherein the data element is selected from the group consisting of a directory, a registry setting, and a file.

5. The method of claim 1, further comprising: prompting a user to choose a scenario for which the suite is being used; calling a function of each component program of the plurality of component programs to determine which of the component programs is a prerequisite to the installation of the suite for the chosen scenario; and installing each component program that is determined to be a prerequisite for the chosen scenario.

6. The method of claim 3, wherein the baseline installation image is modified by the installation of each component program that is determined to be a prerequisite for the chosen scenario.

7. The method of claim 1, wherein the suite has a plurality of scenarios for which it may be used, the method further comprising: calling a function of each component program to determine under which of the plurality of scenarios the component program is a prerequisite to installation of the suite; prompting a user to choose one of the scenarios; and installing each component program that is determined to be a prerequisite for the chosen scenario.

8. The method of claim 1, wherein the calling step results in one or more responses from the functions of the plurality of component programs, the method further comprising: searching a database for an entry indicating whether a component program of the plurality of component programs is a prerequisite to installation of the suite; and if the entry differs from a response of the one or more responses, overriding the response with the entry.

9. The method of claim 1, wherein the function is a component object model interface.

10. The method of claim 1, further comprising: receiving a response from a component program of the one or more component programs, the response indicating whether or not the component program is to be installed.

11. The method of claim 1, wherein the querying step comprises calling a programming interface defined within a component program of the plurality of component programs, the method further comprising: receiving a response from the component program via the programming interface, wherein the determining step comprises determining, based on the response, whether or not the component program is required to be installed as a prerequisite to installing the suite.

12. The method of claim 1, wherein each of the plurality of component programs has a programming interface that allows it to inform a setup program as to whether or not the component program is required to be installed as a prerequisite to installing the suite, and wherein the querying step comprises the setup program querying the programming interface of each of the plurality of component programs as to whether or not the component program is required to be installed as a prerequisite to installing the suite.

13. A method of installing a software suite on a computer system, the suite having a plurality of component programs, the method comprising: sending a query to each of the component programs; receiving, from at least one of the component programs, in response to the query, information regarding whether or not the component program is required to be installed as a prerequisite to installing the suite; searching a database for one or more entries indicating whether the component program is a prerequisite to installation of the suite; searching the database for one or more entries indicating whether the component program is a prerequisite for using the suite in a scenario; resolving conflicts that occur between the information received from the component and the database entries; and, if the information received from the component program indicates that the component program is a prerequisite for the suite or for the scenario, installing the component program on the computer system.

14. The method of claim 13, wherein the installing step further comprises creating a baseline installation image based on the installed component programs.

15. The method of claim 14, further comprising installing at least one data element to modify the baseline installation image.

16. A system for preparing a computer for the installation of a software suite, the system comprising: a plurality of component programs, each component program of the plurality having a function for indicating to a calling program whether or not the component program is a prerequisite for installation of the suite; and a setup program for calling the function of each component program to determine which of the component programs are prerequisites for installation of the suite, and installing, on the computer, the component program that responds to the function call by indicating that it is a prerequisite.

17. The method of claim 13, further comprising: prompting a user to choose a scenario for which the suite is being used; searching a database for one or more entries indicating whether one or more component programs of the plurality of component programs are prerequisites to installation of the suite for the chosen scenario; and installing each component program that is indicated to be a prerequisite for the chosen scenario.

18. The method of claim 13, wherein the suite has a plurality of scenarios for which it may be used, the method further comprising: searching a database for one or more entries indicating whether one or more component programs of the plurality are prerequisites to installation of the suite for the chosen scenario; prompting a user to choose one of the scenarios; and installing each component program that is determined to be a prerequisite for the chosen scenario.

19. A system for preparing a computer for the installation of a software suite, the system comprising: a plurality of component programs, each component program of the plurality having a function for indicating to a calling program whether or not the component program is a prerequisite for installation of the suite; and a setup program for calling the function of each component program to determine which of the components programs are prerequisites for installation of the suite, and installing, on the computer, the component program that responds to the function call by indicating that it is a prerequisite.

20. The system of claim 19, further comprising: a setup database containing an entry for a component of the plurality, the entry being indicative of whether the component is a prerequisite for installation of the suite, wherein the setup program searches the setup database for the entry, and if the entry and the function of the component are in conflict as to whether the component is a prerequisite, then the setup program uses the entry to determine whether to install the component on the computer.

21. The system of claim 19, further comprising a user interface for receiving a selection of a scenario by a user, the scenario being representative of a use for the suite, wherein the setup program calls the function of each component to determine which components are prerequisites to installation of the suite for the chosen scenario; and installs the components determined to be prerequisites onto the computer.

22. A computer-readable medium for installing a software suite on a computer system, the suite having a plurality of component programs, the computer-readable medium having stored thereon computer-executable instructions for performing steps comprising: querying a each of the plurality of component programs to determine which of the component programs is a prerequisite to the installation of the suite; and installing on the computer system each component program of the plurality of component programs that, as a result of the querying step, responds with and indication that it is a prerequisite.

23. The computer-readable medium of claim 22, wherein the installing step further comprises creating a baseline installation image comprising those component programs that are installed in the installing step.

24. The computer-readable medium of claim 23, further comprising installing at least one data element to modify the baseline installation image.

25. The computer-readable medium of claim 24, wherein the data element is selected from the group consisting of a directory, a registry setting, and a file.

26. The computer-readable medium of claim 22, having stored thereon further computer-executable instructions for performing steps comprising: prompting a user to choose a scenario for which the suite is being used; calling a function of each component program of the plurality of component programs to determine which of the component programs is a prerequisite to the installation of the suite for the chosen scenario; and installing each component program that is determined to be a prerequisite for the chosen scenario.

27. The computer-readable medium of claim 22 having stored thereon further computer-executable instructions for performing steps comprising: receiving a response from a component program of the plurality of component programs, the response indicating whether or not the component program is to be installed.

28. A computer-readable medium for installing a software suite on a computer system, the suite having a plurality of component programs, the computer-readable medium having stored thereon computer-readable instructions for performing steps comprising: sending a query to each of the component programs; receiving, from at least one of the component programs, in response to the query, information regarding whether or not the component program is required to be installed as a prerequisite to installing the suite; searching a database for one or more entries indicating whether the component program is a prerequisite to installation of the suite; searching the database for one or more entries indicating whether the component program is a prerequisite for using the suite in a scenario; resolving conflicts that occur between the information received from the components and the database entries; and, if the information received from the component program indicates that the component program is a prerequisite for the suite or for the scenario, installing on the component program on the computer system.

29. The computer-readable medium of claim 28, wherein the installing step further comprises creating a baseline installation image based on the installed component programs.

30. The computer readable medium of claim 28, having stored thereon further computer-executable instructions for performing steps comprising: prompting a user to choose a scenario for which the suite is being used; searching a database for one or more entries indicating whether one or more component programs of the plurality of component programs are prerequisites to installation of the suite for the chosen scenario; and installing each component program that is indicated to be a prerequisite for the chosen scenario.

31. A method for installing a software suite on a computer, the method comprising: executing a setup program; the setup program calling a programming interface of a first program of the software suite, the programming interface being a part of the first program; the first program indicating to the setup program, in response to the calling step, that the first program is required to be installed on the computer prior to the setup program installing at least a second program of the software suite; and the setup program installing the first program on the computer in response to the indicating step.

32. A computer-readable medium having stored thereon computer executable instructions for performing the method of claim 31.

33. The method of claim 31, further comprising: the setup program calling the programming interface of a third program of the software; the third program indicating to the setup program, in response to the calling step, that the third program is not required to be installed on the computer as a prerequisite to installing other programs of the software suite; and the setup program refraining from installing the third program in response to the indicating step.

34. The method of claim 31, wherein the software suite comprises a plurality of programs, the method further comprising: the setup program calling, in addition to the programming interface of the first program, the programming interfaces of each of the rest of the plurality of programs of the software suite; and the setup program installing each program that responds by indicating that it is required to be installed as a prerequisite to installing the software suite.

35. The method of claim 34, wherein, prior to the executing step, the software suite is not ready to be used, and wherein, after the executing step, the software suite is ready to be used.

36. The method of claim 31, wherein the software suite comprises a plurality of programs, the method further comprising: the setup program calling the programming interface of a third program of the software; the third program indicating to the setup program, in response to the calling step, that the third program is not required to be installed on the computer as a prerequisite to installing other programs of the software suite; the setup program refraining from installing the third program in response to the indicating step; the setup program calling, in addition to the programming interfaces of the first and third programs, the programming interfaces of each of the rest of the plurality of programs of the software suite; and the setup program installing each program that responds by indicating that it is required to be installed as a prerequisite to installing the software suite.

37. The method of claim 31, further comprising: the setup program, upon installing the first program, installing the second program, for which the first program is a prerequisite.

38. The method of claim 31, wherein the indicating step comprises: the first program storing, in a location of a memory of the computer, an alphanumeric value that indicates that the first program is required to be installed on the computer prior to the setup program installing at least the second program of the software suite; and the first program passing a pointer to the location to the setup program.

39. The method of claim 31, wherein the setup program determines which programs of the software suite are to be installed on the computer by only calling programming interfaces of programs that are both part of the software suite itself and are executable to provide services to users.

40. The method of claim 31, wherein the setup program determines whether the first program is to be installed on the computer without referring to a list of required programs.

41. A method for installing a software suite on a computer, the method comprising: executing a setup program; receiving, from a user, an indication of a particular scenario in which the software suite is to be used; the setup program calling a programming interface of a first program of the software suite, the programming interface being a part of the first program; the first program indicating to the setup program, in response to the calling step, that the first program is required to be installed on the computer for the particular scenario chosen by the user; and the setup program installing the first program on the computer in response to the indicating step.

42. A computer-readable medium having stored thereon computer-executable instructions for performing the method of claim 41.

43. The method of claim 41, wherein the receiving step comprises receiving from the user an indication that the suite is to be used in a standalone scenario, and wherein the indicating step comprises the first program indicating, in response to the calling step, that the first program is required to be installed in a standalone scenario.

44. The method of claim 41, wherein the receiving step comprises receiving from the user an indication that the suite is to be used in a branch office scenario, and wherein the indicating step comprises the first program indicating, in response to the calling step, that the first program is required to be installed in a branch office scenario.

45. The method of claim 41, wherein the receiving step comprises receiving from the user an indication that the suite is to be used in a home office scenario, and wherein the indicating step comprises the first program indicating, in response to the calling step, that the first program is required to be installed in a home office scenario.

* * * * *

UNITED STATES PATENT AND TRADEMARK OFFICE
CERTIFICATE OF CORRECTION

PATENT NO. : 6,618,857 B1
DATED : September 9, 2003
INVENTOR(S) : Zimniewicz et al.

It is certified that error appears in the above-identified patent and that said Letters Patent is hereby corrected as shown below:

Column 5,
Line 40, "to the to" should read -- to --.

Column 10,
Line 27, "A system for preparing…" should read -- The method of claim 15, wherein the data element is selected from the group consisting of a directory, a registry setting, and a file --.
Line 66, "component of" should read -- component program of --.
Line 67, "plurality," should read -- plurality of the component programs, --.

Column 11,
Line 1, "nent is" should read -- nent program is --.
Line 11, "which components" should read -- which component programs of the plurality of component programs --.

Signed and Sealed this

Twentieth Day of July, 2004

JON W. DUDAS
*Acting Director of the United States Patent and Trademark Office*